(12) United States Patent
Iwatani et al.

(10) Patent No.: US 6,344,734 B1
(45) Date of Patent: Feb. 5, 2002

(54) CONTROLLER OF AC GENERATOR FOR USE IN VEHICLES

(75) Inventors: Shiro Iwatani; Kazuya Tokugawa, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/381,457
(22) PCT Filed: Jan. 27, 1998
(86) PCT No.: PCT/JP98/00313
§ 371 Date: Sep. 21, 1999
§ 102(e) Date: Sep. 21, 1999
(87) PCT Pub. No.: WO99/38239
PCT Pub. Date: Jul. 29, 1999

(51) Int. Cl.[7] .............................. H02H 7/06; H02H 7/08; H02H 7/09; H02H 7/00; H02P 9/00; H02P 9/38; H02P 11/00; H02P 11/04; H02K 11/00; H02K 11/04
(52) U.S. Cl. ............................ 322/28; 322/24; 322/99; 322/25
(58) Field of Search .............................. 322/28, 25, 99; 320/104

(56) References Cited

U.S. PATENT DOCUMENTS

| 5,061,889 A | * | 10/1991 | Iwatani et al. | 322/28 |
| 5,144,220 A | * | 9/1992 | Iwatani et al. | 322/28 |
| 5,260,641 A | * | 11/1993 | Iwatani | 322/28 |
| 5,491,400 A | * | 2/1996 | Iwatani et al. | 322/28 |
| 5,497,071 A | * | 3/1996 | Iwatani et al. | 322/28 |
| 5,581,172 A | * | 12/1996 | Iwatani et al. | 322/28 |
| 5,675,237 A | * | 10/1997 | Iwatani | 322/28 |
| 5,686,819 A | * | 11/1997 | Iwatani et al. | 322/25 |
| 5,886,500 A | * | 3/1999 | Iwatani et al. | 320/104 |

FOREIGN PATENT DOCUMENTS

| JP | 62-107643 | 5/1987 |
| JP | 4-69020 | 3/1992 |
| JP | 6-311799 | 11/1994 |
| JP | 7-194023 | 7/1995 |

* cited by examiner

Primary Examiner—Nestor Ramirez
Assistant Examiner—Julio C. Gonzalez
(74) Attorney, Agent, or Firm—Sughrue Mion, PLLC

(57) ABSTRACT

An AC generator control apparatus for automobiles includes a car battery charged by the rectified output from an AC generator for automobiles; a voltage regulator circuit for intermittently controlling the exciting current flowing through the field coil of the AC generator and adjusting the generated output voltage into a set value; and a set signal output unit for outputting to the voltage regulator circuit an output voltage value set signal of the AC generator depending on the detection results of various operation states of automobiles. The voltage regulator circuit includes a set value switching means for switching and setting a value of an output voltage of the AC generator depending on the contents of the set signal input from the set signal output unit; an output voltage detection means for detecting the output voltage of the AC generator; and an exciting current control means for intermittently controlling the exciting current depending on the comparison result between the set values of the detected output voltage and the output voltage of the AC generator.

4 Claims, 4 Drawing Sheets

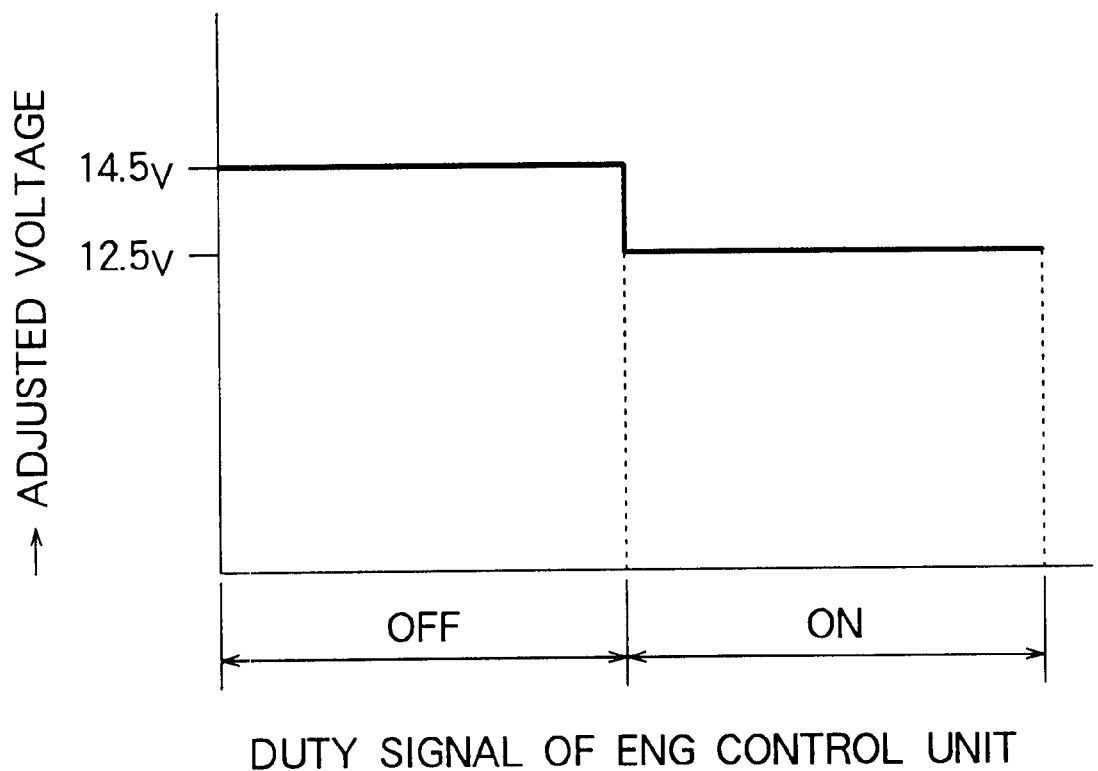

CONTROLLER OF AC GENERATOR FOR USE IN VEHICLES

Technical Field

The present invention relates to an AC generator control apparatus for automobiles for switching the output voltage of an AC generator into any of plural variations according to an external signal having a variable duty ratio.

BACKGROUND ART

FIG. 3 shows the configuration of the conventional AC generator control apparatus for automobiles. This AC generator control apparatus for automobiles includes an AC generator 1 having a field coil 102 which is driven by a car engine (system) not shown and generates a rotating field, and an armature winding 101 generates an AC voltage through the generated rotating field and outputs the AC voltage; a rectifier 2 for rectifying the generated voltage of the AC generator 1 and providing the generated voltage to a battery 5 or an electric load 6 through a main output terminal 201; a voltage regulator 3 for controlling the exciting current of the field coil 102 depending on the charged voltage of the battery 5 or the rectified output voltage provided for the electric load 6, and for regulating the generated voltage of the AC generator 1; a load switch 7 for connecting the rectified voltage from the rectifier 2 or the charged voltage of the battery 5 to the electric load 6; and a key switch 8 transmitting an exciting current from the battery 5 to the field coil 102 through a charge indication lamp 9 when the system (engine) is started.

The rectifier 2 is provided with an auxiliary output terminal 202. The auxiliary output terminal 202 is connected to one end of the charge indication lamp 9. When the electric potential of the auxiliary output terminal 202 becomes equal to that of the charging terminal of the battery 5, the charge indication lamp 9 is turned off and the charging operation is started.

The voltage regulator 3 connects voltage dividing resistors 301, 302, and 303 serially connected between the charge detection terminal of the battery 5 and the ground through a lead wire C for use in detecting a charged voltage, and a transistor 320, whose collector and emitter are connected across the voltage dividing resistor 303, having a positive electric potential applied to the base through a resistor 300 for a resistor shunt. The collector of a transistor 400 forming part of the engine control unit (ECU) 4 is connected to the base of the transistor 320 through a lead wire A. The emitter of this transistor 400 is grounded, and an ECU signal is input to the base from various sensors.

Connected between the auxiliary output terminal 202 and the ground are voltage dividing resistors 304 and 305 for output voltage detection through a serially connected lead wire; a control transistor 321 whose emitter is connected to the ground and whose collector is connected to the auxiliary output terminal 202 through a resistor 306; and an output transistor 322, whose emitter is connected to the earth, whose base is connected to the collector of the control transistor 321, and whose collector is connected to the auxiliary output terminal 202 through a diode 313D. The ends of the field coil 102 are connected to the connection points among the auxiliary output terminal 202, the collector of an output transistor 322, and the anode of the diode 313D.

The anodes of diodes 310 and 311 are respectively connected to the connection points between the voltage dividing resistors 301 and 302 and the voltage dividing resistors 304 and 305. The cathodes of the diodes 310 and 311 are commonly connected to the base of the control transistor 321 through a Zener diode 312.

The operations of the conventional apparatus are described below by referring to the views showing the characteristics of the output voltage shown in FIG. 4.

If the key switch 8 is turned on when the engine is started, an electric current flows through the output transistor from the battery 5 through the key switch 8, the charge indication lamp 9, and the resistor 306. At this time, the battery voltage is not charged enough to set the Zener diode 312 in a continuity state. Therefore, the control transistor 321 remains in the OFF state.

When the output transistor 322 is turned on, an exciting current flows through the battery 5, the key switch 8, the charge indication lamp 9, the field coil 102, the output transistor 322, and the field coil 102 through the loop of the ground. At this time, the charge indication lamp 9 is turned on.

After the exciting current flows through the field coil 102 and the AC generator 1 is driven by the engine, the generated output is rectified by the rectifier 2 and output to the auxiliary output terminal 202, thereby raising the terminal voltage. When the terminal voltage of the auxiliary output terminal 202 equals or exceeds a predetermined value and becomes approximately equal to the battery voltage, the charge indication lamp 9 is turned off to indicate that the generating state is entered.

During the generating operation, if the charged voltage of the battery 5 is detected by the voltage dividing resistors 301, 302, and 303 from the charge detection terminal through the lead wire C, and if the charged voltage equals or exceeds a predetermined value (14.5V or 12.5V) described later, then the Zener diode 312 is set in a continuity state and the control transistor 321 is turned on.

When the control transistor 321 is turned on, the electric potential of the base of the output transistor 322 falls down to the electric potential of the ground, and the output transistor 322 is turned off with the exciting current reduced. As a result, if the output voltage drops, and the charged voltage of the battery 5 becomes lower than a predetermined value, then the output transistor 322 is turned on, the exciting current increases, the output voltage rises, and the charged voltage of the battery 5 also increases. These operations are repeated to adjust the output voltage into a predetermined value.

Described below is the operation to be performed when the output voltage is adjusted into 14.5V. When the ECU signal to a transistor 400 forming part of an ECU 4 is set OFF and the transistor 400 is set in the OFF state, a base current flows in the transistor 320 through the resistor 300. When the transistor 320 is turned on and shunts the voltage dividing resistor 303, the voltage dividing resistor is a serially connected voltage dividing resistors 301 and 302. If the battery voltage becomes equal to or higher than 14.5 V in this resistance ratio, then the divided voltage obtained using the voltage dividing resistor reaches the voltage level at which the Zener diode can be set in the continuity state. With the control transistor 321 set ON and the output transistor 322 set OFF, the exciting current decreases and the output voltage drops, thereby lowering the charged voltage of the battery 5.

If the charged voltage is equal to or lower than 14.5V and the control transistor 321 is turned off again, then the output transistor 322 is turned on and the exciting current increases, thereby raising the output voltage. These operations are repeated to adjust the output voltage into 14.5V.

However, if the engine is in the idle state and the electric load is almost zero, and the battery voltage is set to 12.5V to attenuate the load of the engine for the AC generator 1, then the ECU signal is set ON and the transistor 400 is set ON. As a result, the electric potential of the base of the first transistor 320 becomes the electric potential of the ground, and the voltage dividing resistor is a serially connected voltage dividing resistor 301, 302, and 303. If the battery voltage becomes equal to or higher than 12.5 V in this resistance ratio, then the divided voltage obtained using the voltage dividing resistor reaches the voltage level at which the Zener diode can be set in the continuity state. The subsequent operations are the same as in the case that the output voltage is adjusted into 14.5V.

Thus, the load of an engine can be attenuated in an idle state, etc. by switching an output voltage. Such a switching operation is performed as an effective measure to improve the fuel efficiency.

As described above, the conventional apparatus is controlled such that the output voltage of the AC generator can be set to 14.5V. Since the amount of the generated voltage is reduced by switching the adjusted voltage into 12.5V according to a signal from the ECU, the load of the engine can be attenuated, thereby improving the fuel efficiency. The battery, however, cannot be quickly charged.

Furthermore, since the battery voltage becomes equal to or lower than 10V when the engine is started, there has been the problem with the conventional technology that the generator is in a generation state even if the adjusted voltage is switched into 12.5V, thereby failing to cut the generation and improve the starting characteristics.

The present invention has been developed to solve the above described problem, and aims at providing an AC generator control apparatus for automobiles capable of quickly charging a voltage, collecting an energy when the car is decelerated, completely cutting the generation, and improving the starting characteristics by attenuating the torque load when the engine is started.

Disclosure of the Invention

1. The present invention includes a car battery charged by the rectified output from an AC generator for automobiles; a voltage regulator circuit for intermittently controlling the exciting current flowing through the field coil of the AC generator and adjusting the generated output voltage into a set value; and a set signal output unit for outputting to the voltage regulator circuit an output voltage value set signal of the AC generator depending on the detection results of various operation states of automobiles. The voltage regulator circuit includes a set value switching means for switching and setting a value of an output voltage of the AC generator depending on the contents of the set signal input from the set signal output unit; an output voltage detection means for detecting the output voltage of the AC generator; and an exciting current control means for intermittently controlling the exciting current depending on the comparison result between the detected output voltage and the set value of the set output voltage of the AC generator.

2. In the AC generator control apparatus for automobiles according to the present invention, the set signal output unit sets a duty ratio of a signal depending on the detected state of the operation of an automobile, and outputs the set signal with duty ratio to the set value switch means, and the set value switch unit discriminates the duty ratio and switches and outputs the output voltage set value corresponding to the duty ratio.

3. In the AC generator control apparatus for automobiles according to the present invention, the set value switch means sets the output voltage set value to the fourth predetermined value lower than the battery voltage when the system is started, sets the output voltage set value to the first predetermined value higher than the battery voltage during the normal operation after the system has been started, sets the output voltage set value to the second predetermined value higher than the first predetermined value when the car is decelerated and the battery is quickly charged, preliminarily sets the output voltage set value to the third predetermined value between the first and the fourth predetermined value when the electric load is small and a large system drive torque is required, and switches and outputs the predetermined value corresponding to the duty ratio from the comparison result between the output voltage set value corresponding to the input duty ratio and each of the predetermined values.

4. The AC generator control apparatus for automobiles according to the present invention is set to 14.5V as the first predetermined value, 16.5V as the second predetermined value, 12.5V as the third predetermined value, and 5V as the fourth predetermined value.

5. The AC generator control apparatus for automobiles according to the present invention includes a set means switch means which discriminates a duty ratio, converts the voltage of the signal having the duty ratio into the output voltage set value, and compares the set value with each predetermined value.

6. The AC generator control apparatus for automobiles according to the present invention includes an exciting current control means which switches the resistor voltage division ratio based on the comparison result of the set value switch means, outputs the divided voltage as an output voltage set value depending on the resistor voltage division ratio, and intermittently controls the exciting current based on the comparison result between the output voltage detected by the output voltage detection means and the output voltage set value.

BRIEF DESCRIPTION OF THE DRAWINGS

FIG. 4 shows the characteristics of the output voltage according to a conventional device.

BEST MODE FOR CARRYING OUT THE INVENTION

Figure 1:
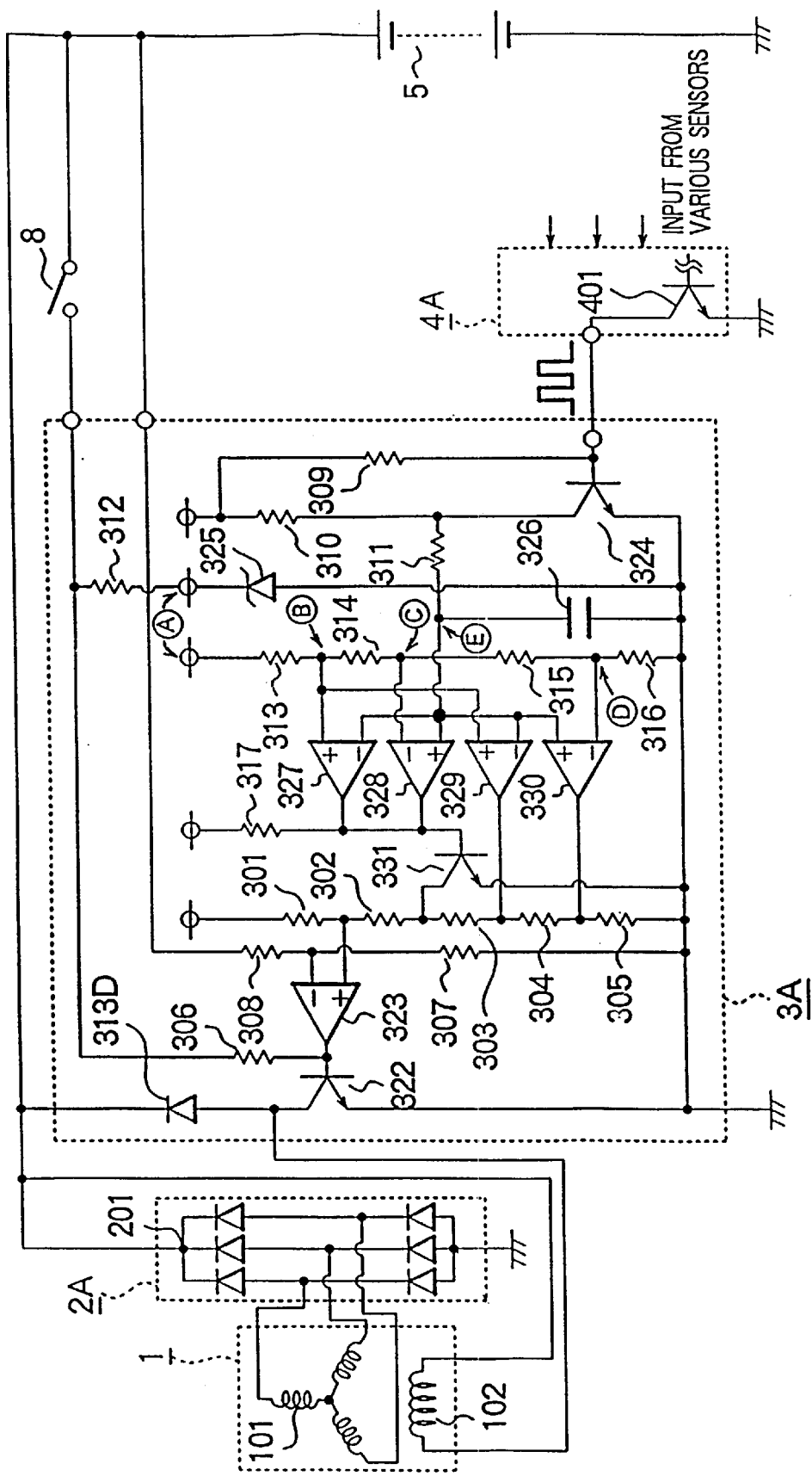
FIG. 1 shows the configuration of the AC generator control apparatus for automobiles according to the embodiment of the present invention.
Figure 3:
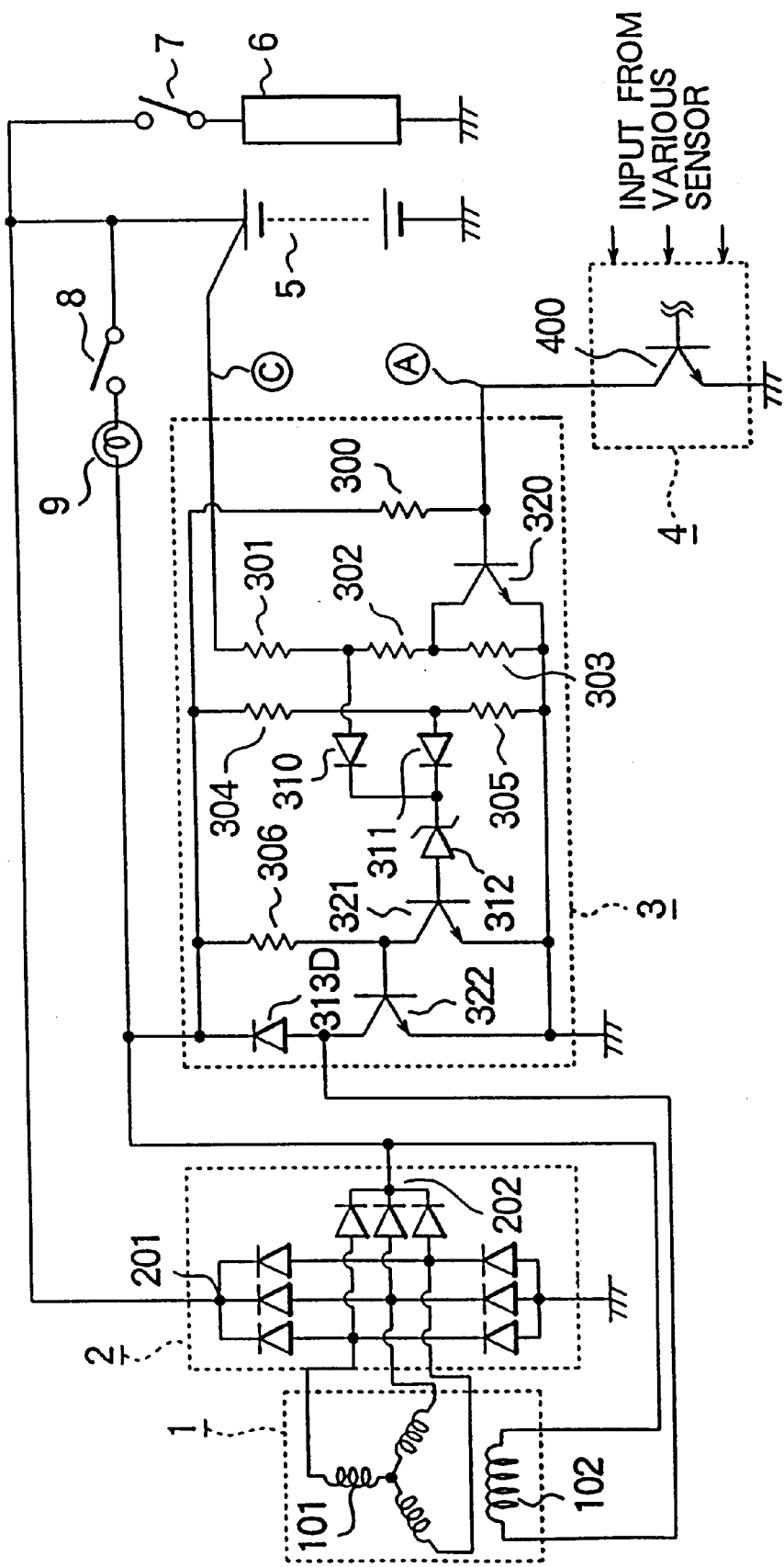
FIG. 3 shows the configuration according to the conventional AC generator control apparatus for automobiles.

The embodiments of the present invention are described below by referring to FIG. 1. In FIG. 1, the identification number also shown in FIG. 3 indicates the same unit or the corresponding unit. The rectifier 2A according to the present embodiment has no auxiliary output terminals. The ECU4A according to the present embodiment outputs to the voltage regulator 3A through a lead wire a duty signal having the duty ratio corresponding to the sensor signal (ECU signal) of various sensors not shown in FIG. 1. The collector of a transistor 401 forming part of the ECU 4A is connected to the base of a transistor 324 through the lead wire. The emitter of transistor 401 is grounded, and an ECU signal is input to the base from various sensors.

The voltage regulator 3A according to the present embodiment comprises a constant voltage circuit having an operating resistor 312 and a Zener diode 325 serially connected between the charging terminal and the ground of the battery 5 through the key switch 8. The voltage generated by the constant voltage circuit is provided as a power source voltage of the voltage regulator 3A for each of the +V terminals.

The voltage regulator 3A comprises a duty voltage generation circuit for generating a voltage according to a duty signal (duty voltage); a switch signal output circuit for outputting an output voltage set switch signal depending on the generated duty voltage; a set value switch circuit for switching an output voltage set value which is a comparison reference value of the output voltage according to the output voltage set switch signal; and an exciting current control circuit for ON/OFF controlling an exciting current to the field coil 102 based on the comparison result between the output voltage set value switched by the set value switch circuit and the detected output voltage.

The duty voltage generation circuit comprises a transistor 324, whose emitter is grounded, and whose base receives a duty signal from the ECU4A, for connecting a resistor 310 between the collector and the +V terminal; a resistor 309, connected between the +V terminal and the base, for restricting the base current; and a capacitor 326 connected in parallel to the collector and the emitter through a resistor 311 connected to the collector. A duty voltage according to a duty signal is retrieved from the connection point E between the capacitor 326 and the resistor 311.

The switch signal output circuit comprises the resistors 313, 314, 315, and 316 serially connected between the +V terminal and the ground; a comparator 327 for inputting a divided voltage generated at a connection point B between the resistors 313 and 314 to a non-inverted input terminal (hereinafter described as a + input terminal); a comparator 328 for inputting a divided voltage generated at a connection point C between the resistors 314 and 315 to an inverted input terminal (hereinafter described as a − input terminal); a comparator 329 for inputting a divided voltage generated at a connection point B between the resistors 313 and 314 to a + input terminal; and a comparator 330 for inputting a divided voltage generated at a connection point D between the resistors 315 and 316 to a − input terminal.

The charged voltage of the capacitor 326, that is, the voltage generated at the connection point E, is a duty voltage proportional to the duty signal from the ECU4A, and is set to a voltage of the +v terminal at the point A when the duty signal is 100%. The voltage at the connection point A is 5V, the voltage at the connection point B is 3.75V, the voltage at the connection point C is 2.5V, and the voltage at the connection point D is 1.25V.

Other input terminals of the comparators 327 and 330 are commonly connected to the connection point E. Therefore, each of the comparators 327 through 330 compares the duty voltage generated at the connection point E with each of the set divided voltages, and sets the output terminal high or low from the comparison result.

The set value switch circuit comprises resistors 301 through 305 serially connected between the +V terminal and the ground; and a transistor 331 whose collector is connected to the connection point between the resistors 302 and 303, whose emitter is grounded, and whose base is connected to the +V terminal through the resistor 317. The output terminals of the comparators 327 and 328 are connected to the connection point between the base of the transistor 331 and the resistor 317. The output terminal of the comparator 329 is connected to the connection point between the resistors 303 and 304. The output terminal of the comparator 330 is connected to the connection point between the resistor 304 and the resistor 305.

The field current control circuit comprises a comparator 323 whose + input terminal is connected to the connection point between the resistors 301 and 302, and whose − input terminal is connected to the connection point between the resistors 308 and 307 serially connected between the charging terminal of the battery 5 and the ground; an output transistor 322 whose emitter is grounded, whose base is connected to the output terminal of the comparator 323, and whose collector is connected to the charging terminal through the diode 313D; and a resistor 306 whose battery 5 is connected to the base of the output transistor 322 through the key switch 8.

One end of the field coil 102 is connected to a charging terminal, and the other end of the field coil 102 is connected to the collector of the output transistor 322.

The operation according to the present embodiment is described below by referring to the characteristics of the output voltage shown in FIG. 2.

First, an exciting current flows through the loop of the battery 5, the field coil 102, the output transistor 322, and the ground to the field coil 102 by introducing an electric current to the output transistor 322 from the battery 5 through the resistor 306 after setting the key switch 8 ON when the engine is started.

In this state, when the engine starts driving the AC generator 1, the generated output is rectified by the rectifier 2A and provided for the battery 5 or an electric load not shown in FIG. 1 from the main output terminal 201.

Figure 2:
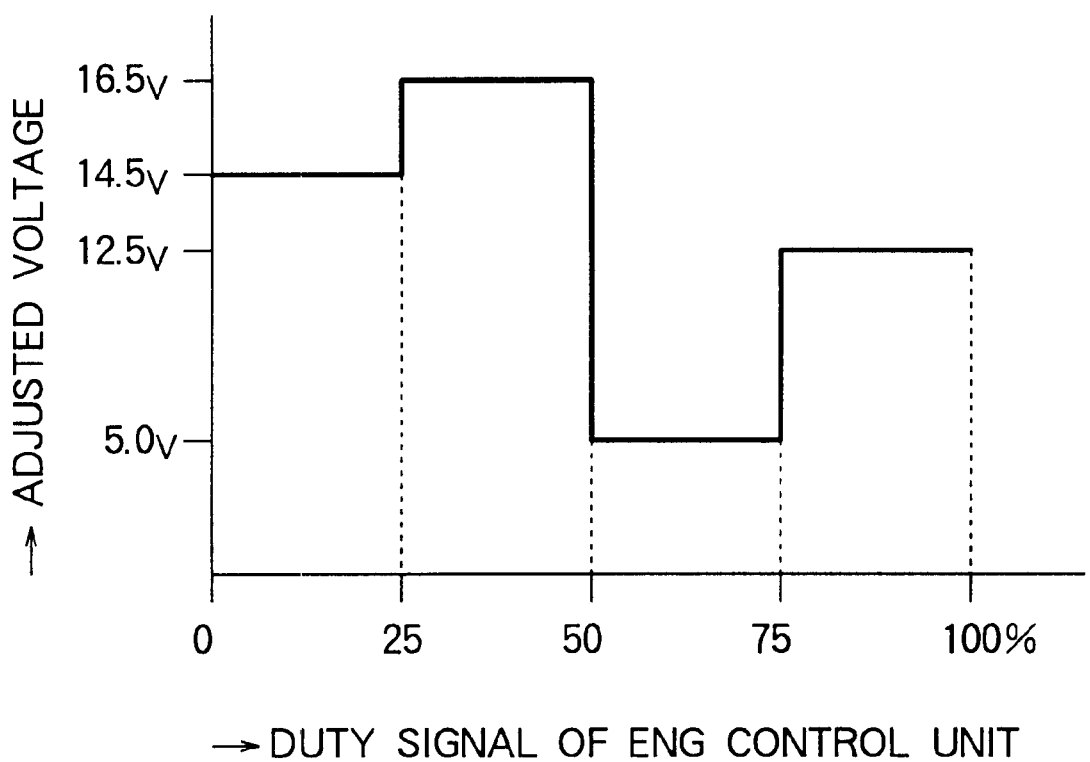
FIG. 2 shows the characteristics of the output voltage according to the embodiments of the present invention.

Described below is the operation performed when the output voltage of the AC generator 1 is controlled to be 14.5V as shown in FIG. 2. When the duty signal from the ECU4A is 0%, a base current flows through the base of the transistor 324 via the resistor 309. As a result, the electric potential at the connection point E is 0, and the output terminals of the comparators 327 and 329 whose − input terminals are connected to the connection point E become high whereas the output terminals of the comparators 328 and 330 whose + input terminals are connected to the connection point E become low. Therefore, only the voltage dividing resistor 305 is short-circuited to a ground level by the comparator 330, and a setting switch circuit is formed by the voltage dividing resistors 301 through 304. In this case, the output voltage is set to 14.5V. When the output voltage equals or exceeds the set voltage (14.5V), the output terminal of the comparator 323 becomes low, and the output transistor 322 is turned off. As a result, the field current to the field coil 102 decreases, and the output voltage drops. When the output voltage becomes equal to or lower than the set voltage (14.5V), the output terminal of the comparator 323 becomes high and the output transistor 322 is turned on. Thus, the exciting current increases and the output voltage rises.

Described below is the operation performed when the output voltage of the AC generator 1 is controlled to be 16.5V as shown in FIG. 2. If the transistor 324 is turned on/off according to the duty signal when the duty signal from the ECU4A is 40%, then the average voltage at the connection point E becomes 2V through the integration circuit of the resistors 310 and 311 and the capacitor 326, and the outputs of the comparators 327, 328, 329, and 330 are respectively high, low, high, and high. Since the entire resistors 303 through 305 are serially connected to the voltage dividing resistor 302, the set value switch circuit is formed by the voltage dividing resistors 301 through 305. In this case, the output voltage is set to 16.5V.

When the output voltage equals or exceeds the set voltage (16.5V), the output terminal of the comparator 323 becomes low, and the output transistor 322 is turned off. As a result, the exciting current to the exciting coil 102 decreases, and the output voltage drops. When the output voltage becomes equal to or lower than the set voltage (16.5V), the output terminal of the comparator 323 becomes high and the output transistor 322 is turned on. Thus, the exciting current increases and the output voltage rises.

Described below is the operation performed when the output voltage of the AC generator 1 is controlled to be 5V as shown in FIG. 2. If the transistor 324 is turned on/off according to the duty signal when the duty signal from the ECU4A is 60%, then the average voltage at the connection point E becomes 3V through the integration circuit of the resistors 310 and 311 and the capacitor 326, and the outputs of the comparators 327, 328, 329, and 330 are respectively high, high, high, and high.

As a result, the transistor 331 is turned on and the voltage dividing resistors 303 through 305 are short-circuited. Therefore, the set value switch circuit is formed by the voltage dividing resistors 301 and 302. In this case, the output voltage is set to 5V. However, the above described set value is smaller than the value when the battery voltage drops at the start of the engine, and the output of the comparator 323 becomes low. The output transistor 322 is fixed in the OFF state, thereby completely cutting the generation.

Described below is the operation performed when the output voltage of the AC generator 1 is controlled to be 12.5V as shown in FIG. 2. If the transistor 324 is turned on/off according to the duty signal when the duty signal from the ECU4A is 80%, then the average voltage at the connection point E becomes 4V through the integration circuit of the resistors 310 and 311 and the capacitor 326, and the outputs of the comparators 327, 328, 329, and 330 are respectively low, high, low, and high.

As a result, the voltage dividing resistors 304 and 305 are short-circuited, and the resistor 303 is serially connected to the voltage dividing resistor 302. Therefore, the set value switch circuit is formed by the voltage dividing resistors 301, 302, and 303. In this case, the output voltage is set to 12.5V. Consequently, when the output voltage equals or exceeds the set voltage (12.5V), the output terminal of the comparator 323 becomes low, and the output transistor 322 is turned off. As a result, the exciting current to the exciting coil 102 decreases, and the output voltage drops. When the output voltage becomes equal to or lower than the set voltage (12.5V), the output of the comparator 323 becomes high and the output transistor 322 is turned on. Thus, the exciting current increases and the output voltage rises.

Thus, the output voltage can be set to any of the four values according to the duty signal from the ECU4A.

As a result, an energy can be collected for quick charge and deceleration of an automobile, and the generation can be completely cut. Furthermore, the torque load at the start of the engine can be reduced, thereby improving the starting characteristics.

A high voltage value can also be set to 30V through 40V for a medium heating power source as a measure for a gas.

INDUSTRIAL APPLICABILITY

An output voltage of an AC generator for automobiles can be adjusted into an optimum voltage depending on the operation state by adjusting and setting the output voltage according to an externally input operation state detection signal.

What is claimed is:

1. An AC generator control apparatus for an automobile, comprising:

a voltage regulator circuit for intermittently controlling an exciting current flowing through a field coil of an AC generator and adjusting a generated output voltage to an AC generator output voltage set value, said voltage regulator circuit comprising:
  set value switching means for switching and setting the AC generator output voltage set value in response to an output voltage value set signal;
  output voltage detection means for detecting the output voltage of the AC generator; and
  exciting current control means for intermittently controlling the exciting current depending on a comparison result between the detected output voltage of the AC generator and the AC generator output voltage set value, and completely cutting off voltage generation when the AC generator output voltage set value is below a voltage of an automobile battery during starting of an automobile engine; and a set signal output unit for supplying to said voltage regulator circuit said output voltage value set signal in accordance with an operational state of the automobile;

wherein said set signal output unit sets a duty ratio of a signal depending on the operational state of the automobile and outputs the duty ratio to said set value switching means, and said set value switching means discriminates the duty ratio and switches and outputs the AC generator output voltage set value corresponding to the duty ratio; and wherein said set value switching means sets the AC generator output voltage set value to a fourth predetermined value lower than the battery voltage when a system is started, sets the AC generator output voltage set value to a first predetermined value higher than the battery voltage during a normal operation after the system has been started, sets the AC generator output voltage set value to a second predetermined value higher than the first predetermined value when a car is decelerated and the battery is quickly charged, preliminarily sets the AC generator output voltage set value to a third predetermined value between the first and the fourth predetermined value when an electric load is small and a large system drive torque is required, and switches and outputs the predetermined value corresponding to the duty ratio from a comparison result between the AC generator output voltage set value corresponding to the input duty ratio and each predetermined value.

2. The AC generator control apparatus for an automobile according to claim 1 wherein:
  said first predetermined value is set to 14.5V, said second predetermined value is set to 16.5V, said third predetermined value is set to 12.5V, and said fourth predetermined value is set to 5V.

3. The AC generator control apparatus for an automobile according to claims 1 or 2 wherein:
  said set value switching means discriminates a duty ratio, converts a voltage of a signal having the duty ratio into an output voltage set value, and compares the set value with each predetermined value.

4. The AC generator control apparatus for an automobile according to claim 3 wherein:

said exciting current control means switches a resistor voltage division ratio based on a comparison result of said set value switching means, outputs a divided voltage as an output voltage set value depending on the resistor voltage division ratio, and intermittently controls the exciting current based on a comparison result between the output voltage detected by said output voltage detection means and the output voltage set value.

* * * * *